INVENTORS
Carl D. Keith
Teunis Schreuders
Charles E. Cunningham
BY
ATTORNEY

INVENTORS
Carl D. Keith
Teunis Schreuders
Charles E. Cunningham
BY
Roger J. Drew
ATTORNEY INVENTORS
Carl D. Keith
Teunis Schreuders
BY Charles E. Cunningham Roger J. Drew
ATTORNEY

United States Patent Office 3,441,381
Patented Apr. 29, 1969

3,441,381
APPARATUS FOR PURIFYING EXHAUST GASES OF AN INTERNAL COMBUSTION ENGINE
Carl D. Keith, Summit, Teunis Schreuders, Irvington, and Charles E. Cunningham, East Orange, N.J., assignors to Engelhard Industries, Inc., Newark, N.J., a corporation of Delaware
Filed June 22, 1965, Ser. No. 465,955
Int. Cl. B01j 9/04
U.S. Cl. 23—288         8 Claims

ABSTRACT OF THE DISCLOSURE

Apparatus for purifying internal combustion engine exhaust gases comprises a catalyst, having a cylindrical unitary ceramic skeletal structure with gas flow passages therethrough, disposed in a metal cylindrical housing of larger diameter leaving a narrow annular space between the ceramic structure and the metal housing. Annular flanges provide a continuous barrier to gas flow around the periphery of the supported catalyst as well as a barrier to gas flow through the narrow space. In addition a shell of corrugated knitted metal mesh in the narrow annular space serves to absorb mechanical shock, to secure the ceramic structure laterally, and to compensate for the difference in thermal expansion between the ceramic structure and the metal housing.

---

This invention relates to the purification of exhaust gases from internal combustion engines, and more particularly to a new and improved apparatus for the purification of internal combustion engine exhaust gases to remove combustible, air-polluting constituents therefrom prior to their discharge into the atmosphere.

The problem of purification of exhaust gases from the internal combustion engines of automotive vehicles, for instance automobiles, is well recognized and of long standing. The unburned products of combustion exhausted from the internal combustion engines of automotive vehicles operating on gasoline, particularly the hydrocarbons and oxygenated organic compounds present in the exhaust gases, are primarily responsible for the serious air pollution problems now confronting large metropolitan centers of the country. The exhaust gases also contain the nocuous constituent, carbon monoxide.

Automotive vehicles, operated partially or wholly within enclosed areas such as, for instance, warehouses, industrial plants and office buildings, for instance fork-lift trucks and self-propelled floor washing machines powered by internal combustion engines operating on gasoline, diesel oil, propane, etc., as well as stationary internal combustion engine powered devices, for instance pumps and electric generators operating on the fuels aforementioned, can be a serious source of pollution to the air within such enclosed areas due to products of incomplete combustion in their exhaust gases. Further such vehicles can be a serious hazard to human beings within the enclosed areas due to the nocuous carbon monoxide in the exhaust gases of such vehicles.

In our copending U.S. patent application Ser. No. 256,856, filed Feb. 7, 1963, now abandoned, we disclose and claim apparatus for purifying exhaust gases from internal combustion engines. Such apparatus comprises an exhaust gas flow line having a rectangular-shaped enlarged portion housing a supported oxidation catalyst. The oxidation catalyst comprises a rectangular-shaped unitary ceramic element support having gas inlet and outlet ends, and a plurality of gas flow paths or channels extending between the gas inlet and outlet ends of the unitary ceramic support. The supported oxidation catalyst is of lesser width or diameter than that of the housing whereby spaces are defined between the catalyst and the housing wall. Ceramic blocks or plugs, which are heat insulating and gas impervious, are positioned to fill substantially entirely the spaces between the side faces and top and bottom faces of the supported catalyst and the corresponding inner wall surfaces of the flow line enlarged portion, for thermal insulation purposes and also to block flow of raw exhaust gases through the space between the supported catalyst cartridge and the walls of the flow line enlarged portion. While this apparatus provides satisfactory results for the purification of the exhaust gas to remove its air-polluting constituents, there is room for improvement. The ceramic blocks or plugs press with appreciable force against the top and bottom and side faces of the porous unitary supported oxidation catalyst and have been found to damage one or more of such faces of the supported oxidation catalyst, by crushing and deforming the porous refractory ceramic material of the catalyst support at the support marginal edge portions adjacent and forming such faces and at times even embedding itself in the ceramic face of the support. Further, the refractory ceramic blocks, which are rectangular in shape, are only economically practicable for use with a rectangular or square shaped housing for the supported oxidation catalyst, as the ceramic blocks are very difficult and expensive to form in annular shape which is the shape suitable for use with a cylindrically walled housing.

It is an object of the present invention to provide new and improved exhaust gas purification apparatus for use in connection with the exhaust system of an internal combustion engine.

Another object of the invention is to provide new and improved catalytic exhaust gas purification apparatus which eliminates bypassing of the catalyst by appreciable quantities of raw exhaust gas.

Another object of the invention is to provide a new and improved exhaust gas purifier which eliminates excessive loss of heat from the catalyst and thereby avoids lowering of the catalyst temperature below the reaction temperature for converting air-polluting gas constituents to innocuous constituents.

A further object is to provide an exhaust gas purification apparatus capable of being readily installed in connection with the exhaust system of a conventional automotive vehicle.

A further object is to provide an exhaust gas purifier of relative simplicity in design and of rugged construction.

A further object is to provide exhaust gas purification apparatus which, in addition to effective removal of air-polluting constituents from the exhaust gas, indicates engine efficiency and the need, if any, for adjusting carburetion, timing, etc.

An additional object is to provide an exhaust gas purifier of such design as to be well suited for installation and use in a relatively small and confined area, for instance in connection with the exhaust gas system of a fork lift truck.

An additional object is to provide an exhaust gas purifier of such design as to make it eminently well suited in connection with the exhaust systems of fork lift trucks and other relatively small automotive vehicles operated indoors as well as outdoors.

Additional objects and advantages will be apparent as the invention is hereinafter described in detail.

In the drawings:
FIGURE 1 is a plan view of apparatus for purifying exhaust gases from an internal combustion engine in accordance with this invention;
FIGURE 2 is a longitudinal sectional view through the exhaust gas purifying apparatus herein with the apparatus partially disassembled;

Figure 1:
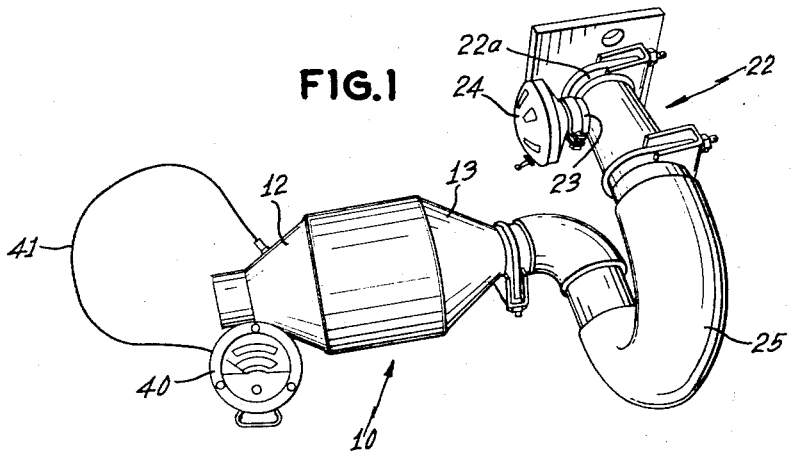

Referring to FIGURE 1, exhaust gas catalytic purifier 10 having frusto-conical end closure members 12 and 13 is connected to venturi-inspirator 22, for admixing air with the exhaust gases from the internal combustion engine, by connecting conduit 25. Inspirator 22 has inlet conduit 23 for air and air filter flame arrestor 24 connected to inlet conduit 23, inspirator 22 being connected to a conduit 22a of the exhaust gas system of an automotive vehicle such as a fork-lift truck. Meter 40 is connected by wire 41 to a conventional thermocouple (not shown) mounted in the outlet end portion of catalytic purifier 10.

With reference to FIGURES 2–5, catalytic exhaust gas purifier 10 comprises cylindrically walled metallic casing 11 of typical dimensions of length of 4″ and outer diameter of 3″, 4″ or 5″, and frusto-conical metallic end closure members 12 and 13 secured at the gas inlet and outlet ends respectively of casing 11 by welding to the opposite outer end inner edge portions of casing 11.

Figure 4:
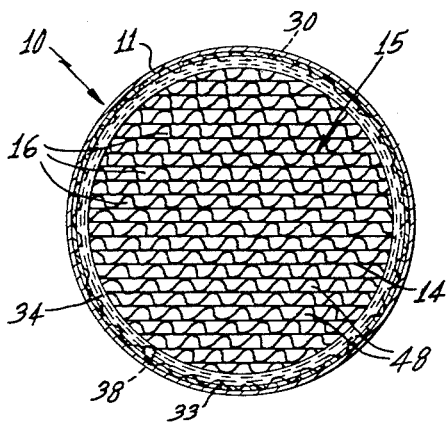
FIGURE 4 is a transverse sectional view taken on lines 4—4 of FIGURE 3.
Figure 5:
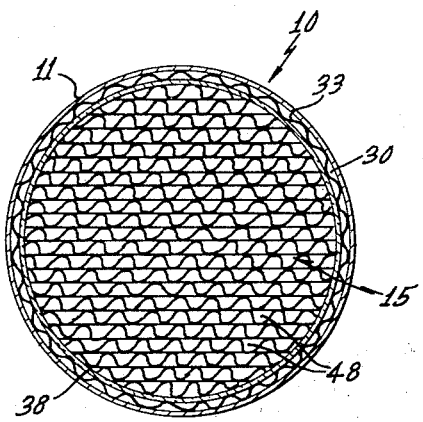
FIGURE 5 is a transverse sectional view taken on lines 5—5 of FIGURE 3.

Frusto-conical member 12 is so dimensioned as to enable distribution or passage of the exhaust gases over the entire or substantially entire cross-sectional area of the upstream portion of casing 11 thereby to enter all or substantially all inlet openings 16 for the gas flow channels 48, such inlet openings 16 being defined over the entire or substantially entire area of face 14 of unitary porous refractory skeletal structure-supported oxidation catalyst 15 as shown in FIGURE 4.

The dimensions of frusto conical member 12 are preferably so related as to satisfy the relationship $$\frac{D-d}{L} = \text{between 0.5 and 3 inclusive}$$

wherein D is the diameter of the wider end 17 of member 12 immediately before annular flange 34 integral therewith, d is the diameter of the narrower end 18 of frusto-conical member 12, and L is the length of frusto-conical member 12, i.e., the length along its principal axis from the wider end to the narrower end thereof or along a line parallel thereto. Frusto-conical member 13 is of similar dimensions as frusto-conical member 12 as shown, and of such dimensions as to enable free passage of gas out of the gas flow channel outlet openings of the supported platinum group metal oxidation catalyst 15 without causing substantial back pressures. Inlet conduit 19 is integral with frusto-conical member 12 as shown, and outlet conduit 20 is integral with frusto-conical member 13 as shown.

Venturi-inspirator 22 having inlet conduit 23 for air and equipped with air filter flame arrester 24 is connected to inlet conduit 19, for admixing air with the exhaust gases from the internal combustion engine. Inspirator 22 comprises metallic shell or housing 25 of typical dimensions of 2″ outer diameter and of about 5⅝″ length, metallic inlet nozzle 26 of typically 1¾″ length, 13/16″ diameter at its narrow outlet end and 2″ diameter at its wider inlet end, and outlet nozzle 27 of typically 3¼″ length, 1″ diameter at its narrower inlet end, and 2″ diameter at its wider outlet end. The spacing between the narrower outlet end of inlet nozzle 26 and the wider inlet end of outlet nozzle 27 is typically ½″.

Figure 7:
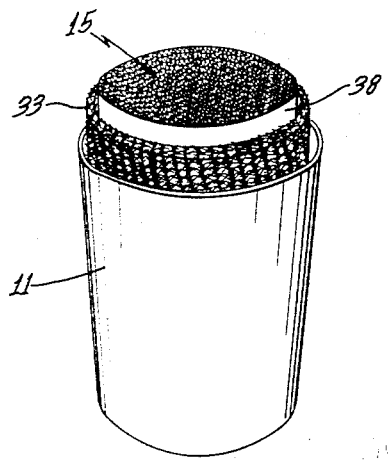
FIGURE 7 is a side elevational view partially broken away of the catalytic gas purifier of the invention.
Figure 9:
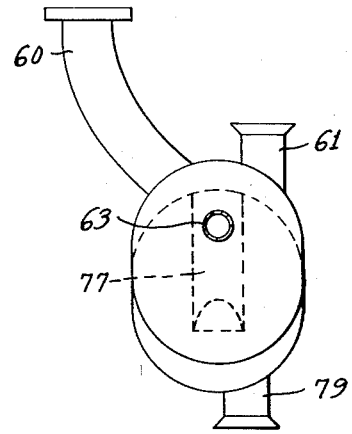
FIGURE 9 is a section view taken on lines 9—9 of FIGURE 8.

An annular space or gap 30 of substantially uniform width is defined between the inner surface 31 of cylindrical casing 11 and the outer surface 32 of the supported oxidation catalyst 15, the unitary refractory support of which is cylindrical and of lesser diameter than the inner diameter of casing 11. While corrugated member 33, shown in FIGURES 4, 5 and 7 and hereinafter described in detail, partially fills space 30, such space extends completely around the supported oxidation catalyst and its entire length. It was found that appreciable quantities of raw exhaust gas would pass through annular space 30 thereby bypassing the oxidation catalyst and exiting from the catalytic purifier 10 still containing its air-polluting constituents. To prevent this undesirable occurrence, annular member or flange 34 bridges the gap or annular space 30 between the inner wall surface 31 and the upstream face marginal edge portion of the unitary support of oxidation catalyst 15 at the entrance to annular space 30, to provide a continuous barrier around the periphery of the supported catalyst against flow of unpurified exhaust gas through the space 30. As shown, annular flange 34 is integral with the frusto-conical member 12 and is a thin narrow width rim or flange of substantially uniform thickness and width formed by bending inwardly the inner terminal end portion of the frusto-conical member 12 a sufficient extent to form the inwardly-extending annular member or flange, the plane of which extends normal to the principal axis of casing 11. Annular space 30 is of width typically of ⅛″, and annular flange 34 is of width typically of ⅜″.

Another annular member or flange 36 also bridges the annular space 30 at the opposite end face of the unitary supported oxidation catalyst 15 and between the inner wall surface 31 and the downstream face marginal edge portion of the catalyst unitary support to provide a continuous barrier around the periphery of the supported catalyst. Annular flange 36 is also integral with frusto conical member 13 and is a thin, narrow width flange of substantially uniform thickness and width formed by bending inwardly the inner terminal end portion of the frusto-conical member 13 similarly as in forming annular flange 34. Annular flange 36 is of similar width as annular flange 34, and the plane of flange 36 is generally perpendicular to the principal axis of frusto-conical member 13.

Annular flange 34, in addition to serving as a barrier to gas flow, functions together with annular member 36 to provide thermal insulation between the unitary supported catalyst 15 and the metallic wall of casing 11. Annular flanges 34 and 36 overlap and block off a narrow annular marginal portion of the respective inlet and outlet faces of the oxidation catalyst 15 to the flow of the elevated temperature exhaust gas, whereby a cooler annular or cylindrically shaped portion of the catalyst refractory support is provided at the peripheral edge portion thereof. This cooler portion of the refractory support material, which itself is a good heat insulator, serves as a thermal insulating zone to diminish the loss of heat to the atmosphere by radiation and conduction. The space 30, which is partially filled with corrugated member 33, is also heat insulating. Consequently, the capability of the supported oxidation catalyst 15 to maintain the elevated temperature necessary for catalyzing the oxidative removal of the air-polluting combustible constituents from the gas is facilitated. Annular rims or flanges 34 and 36 also function to secure or maintain the supported oxidation catalyst 15 within casing 11. Layer 38 of Fiberfrax cement, a fibrous aluminum silicate, is preferably provided with its function being to seal the pores at the outer surface of supported oxidation catalyst 15 and also to serve as a protective coating or padding for the oxidation catalyst.

Corrugated member 33 snugly encompasses unitary refractory element-supported oxidation catalyst 15 in contact therewith and the inner surface of casing 11, for absorbing mechanical shock and compensating for differences in thermal expansion of the metallic casing wall and the refractory ceramic support of catalyst 15. Preferably corrugated member 33 is a corrugated, knitted mesh metallic fabric, shown in FIGURE 7, due to the considerably greater flexibility and resiliency of the knitted mesh fabric than that of a corrugated metal sheet. The knitted mesh fabric provides more points of contact with the supported oxidation catalyst 15, and accordingly there is improved shock absorption and expansion compensation with the knitted fabric.

A thermocouple of, for instance Chromel-Alumel, is mounted in the outlet end portion of catalytic purifier 10, and is connected by thermocouple wire 41 to meter 40 which has been previously calibrated by the manufacturer to show if an adjustment in the fuel-air ratio is necessary. Meter 40 has a "Lean-Rich" scale thereon which indicates if the carburetion is adjusted lean, normal or rich and also defects in the ignition system. By merely looking at meter 40, the owner of the automotive vehicle or a mechanic can immediately be apprised of his engine operating efficiency from the standpoint of fuel consumption and, if indicated by the meter, adjust or have adjusted the carburetion to return fuel-air ratio back to normal. Meter 40 also may have a catalyst activity or "Active" scale separately thereon, and one can quickly ascertain the level of activity of the oxidation catalyst in purifier unit 10 by merely looking at such scale on meter 40. Meter 40 is calibrated with respect the catalyst activity or "Active" scale by relating catalyst activity to temperature.

The purification apparatus of this invention, exclusive of the porous unitary refractory skeletal supported oxidation catalyst, was fabricated of ferrous metal, but can be fabricated of other metals capable of withstanding the high temperatures to which the apparatus is subjected, for instance up to 800° C. and even higher.

Figure 6:
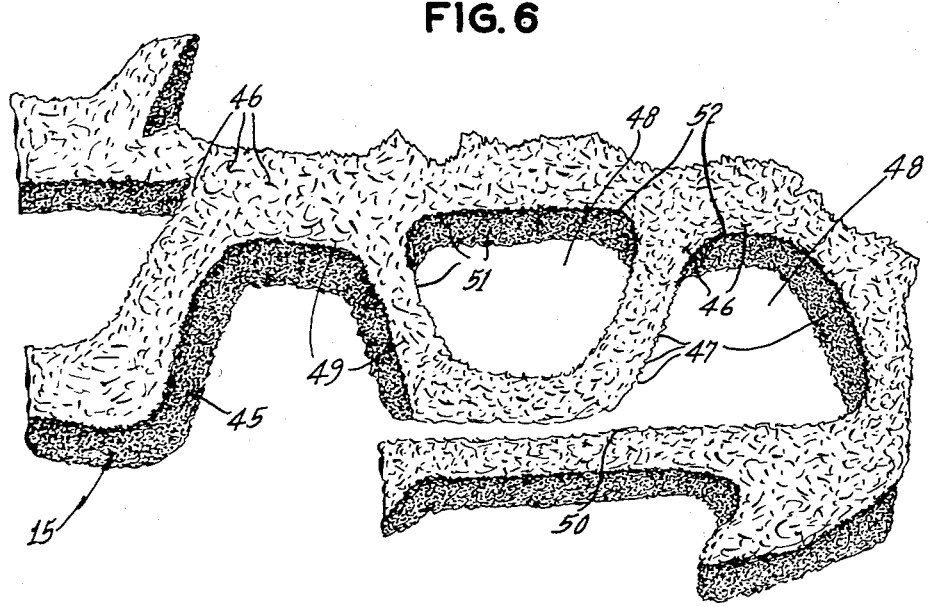
FIGURE 6 is a broken away, enlarged transverse sectional view of a unitary porous refractory skeletal structure-supported oxidation catalyst utilizable in the catalytic gas purifier herein.

With reference to FIGURE 6, supported oxidation catalyst 15 comprises a porous catalytically inert unitary solid refractory skeletal structure 45 of zircon-mullite as support. Porous skeletal structure 45 has pores 46 in its interior portion and also superficial macropores 47 communicating with gas flow channels 48 which extend through skeletal structure 45. Channels 48, as shown, are of generally trapezoidal shape in cross section and are defined by the corrugations 49 and generally horizontal layers 50 of the skeletal structure. An activated refractory metal oxide, for instance gamma alumina, is deposited as discontinuous deposits 51 on the surface of gas flow channels 48 and also on the surfaces of the superficial macropores which communicate with channels 48, and the oxidation catalytic metal 52, for instance platinum, rhodium, palladium or iridium or combinations thereof, $Cr_2O_3$, Mn, $V_2O_5$, Cu, Fe, Co or Ni, is deposited on the activated refractory metal oxide. Some of the catalytic metal may also be deposited directly on the refractory skeletal structure surfaces. Macropores 47 of the skeletal structure are predominantly of size, i.e., diameter, in excess of 2,000 Angstrom units.

The porous unitary inert refractory skeletal structure support of the oxidation catalyst of this invention is characterized by having a large plurality of unobstructed flow channels or paths extending therethrough in the direction of gas flow. The supported catalyst is disposed in the purifier in such fashion that its unitary skeletal structure occupies approximately all of the cross-sectional area of the reaction zone, with the narrow space between it and the purifier wall. Advantageously the unitary skeletal structure is shaped to fit the reaction zone of the purifier casing into which it is to be disposed, and the unitary supported catalyst is placed therein lengthwise as to its cellular gas flow channels, i.e., with the channels extending in the direction of gas flow, between the purifier inlet and outlet so that the gases flow through the channels during their passage through the converter.

The skeletal structure support is constructed of a substantially chemically and catalytically inert, porous, rigid, solid refractory material capable of maintaining its shape and strength at high temperatures, for instance up to 1100° C. or more. It has a low thermal coefficient of expansion which is less than $6 \times 10^{-6}$ per ° C. between 30° C. and 700° C., and such is important for good thermal shock resistance. Further, it has a low thermal conductivity of less than .035 g. cal. cm./(sec.)(cm.$^2$)(° C.). The refractory material has a bulk density of about 0.45–1.75 grams per cubic centimeter, preferably about 0.5–1.2 gram per cubic centimeter and is unglazed and essentially entirely crystalline in form and marked by the absence of any significant amount of glassy or amorphous matrices, for instance of the type found in porcelain materials. Further, the skeletal structure has considerable accessible porosity as distinguished from the substantially nonporous porcelain utilized for electrical applications, for instance spark plug manufacture, characterized by having relatively little accessible porosity. The accessible pore volume not including the volume of the gas flow channels is generally in excess of 0.01 cubic centimeter per gram of skeletal structure, preferably between 0.03 and 0.3 cc./g.

The walls of the channels of the unitary skeletal support structures of this invention contain a multiplicity of surface macropores in communication with the channels to provide a considerably increased accessible catalyst surface, and a substantial absence of small pores for high temperature stability and strength. Whereas the superficial surface area of such structures may be of the order of 0.001 to 0.01 m.$^2$/g. including the channels, the total surface area is typically many times greater, so that much of the catalytic reaction may take place in the large pores. Typically the total accessible surface area of the support is between about 0.1 and 3 m.$^2$/g., preferably between 0.2 and 2.0 m.$^2$/g. The skeletal structure has a macropore distribution such that over 95% of the pore volume is in pores having a size, i.e., diameter, greater than 2000 Angstrom units, and preferably over 50% of the pore volume is in pores having a size of over 20,000 A.

The geometric superficial or apparent surface area of the carrier including the walls of the gas flow channels will often be about 0.5 to 6, preferably 1 to 2.5, square meters per liter of support. The channels through the unitary body or skeletal structure can be of any shape and size consistent with the desired superficial surface and should be large enough to permit free passage of the gas mixture of exhaust gas and oxygen-containing gas. The channels are parallel or generally parallel and extend through the support from one side to an opposite side, such openings being separated from one another by preferably thin walls defining the openings. The channel inlet openings are distributed across the entire face or cross-section of the support subject to initial contact with the gas to be reacted. The preferred skeletal structure supports of this invention are of zircon-mullite, alpha-alumina, alumina-silica-magnesia and zirconium silicate. Examples of other refractory crystalline ceramic materials utilizable in place of the preferred materials as support or carrier are sillimanite, magnesium silicates, zircon, petalite, spodumene, cordierite, and alumina-silicates.

The refractory metal oxide in the preferred embodiment is deposited on the porous unitary skeletal support as a continuous thin deposit or as discontinuous thin deposits preferably of thickness of about 0.0004″ to 0.001″. Such catalytically active oxide is a calcined refractory metal oxide which itself is characterized by a porous structure and which possesses a large internal pore volume and total surface area. Generally, the total surface area of the active refractory metal oxide is at least about 25 square meters/gram, preferably at least about 100 square meters/gram. Such oxides can be prepared by dehydrating preferably substantially completely the hydrate form of the oxide by calcination usually at temperatures of about 150° C. to 800° C. The preferred active metal oxides contain members of the gamma or activated alumina family which can be prepared, for instance, by precipitating a hydrous alumina gel and thereafter drying and calcining to expel hydrated water and provide the active gamma-alumina. A particularly preferred active refractory metal oxide is obtained by drying and calcining at temperatures of about 300° C. to 800° C. a mixture of precursor hydrous alumina phases predominating in crystalline trihydrate, that is, containing in excess of about 50% of the total alumina hydrate composition, preferably about 65%–95%, of one or more of the trihydrate forms gibbsite, bayerite and nordstrandite by X-ray diffraction. The substantial balance of the hydrate, preferably about 35% to 5%, may be amorphous hydrous or monohydrous boehmite alumina. Calcination of the precursor hydrous alumina is preferably controlled so that the gamma-alumina obtained contains monohydrate alumina in an amount substantially equivalent to that originally present in the mixture of the high trihydrate precursor hydrous alumina phases. Other suitable active oxides include for example active or calcined beryllia, zirconia, magnesia, silica, etc., and combinations of metal oxides such as boria-alumina, silica-alumina, etc. Preferably the activated refractory oxide is composed predominantly of oxides of one or more metals of Groups II, III and IV having atomic numbers not exceeding 40. The active refractory metal oxide deposit may constitute about 10 to 150 grams per liter of the unitary support, preferably about 30 to 120 grams per liter.

Providing the support with a deposit of the active refractory metal oxide of the present invention can be done in several ways. One method involves dipping the support into a solution of the salt of the refractory metal and calcining to decompose the salt to the oxide form. A more preferred method comprises dipping the support into an aqueous suspension, dispersion or slurry of the refractory oxide itself, drying and calcining. In this method, suspensions or dispersions having a solids content in range of about 10% to 70% by weight can be used to deposit a suitable amount of an active refractory metal oxide on the support in a single application. In order to prepare a catalyst having 10% activated alumina on a zircon-mullite structure, about 20%–40% solids in the suspension is used. The percent solids is determined on an ignited weight basis (ignited at 1100° C.). In general calcining temperatures within the range of about 150° C. to 800° C. are employed. The calcination is favorably conducted in air, for example flowing dried air, or may be carried out in contact with other gases such as oxygen, nitrogen, hydrogen, flue gas, etc., or under vacuum conditions. The refractory oxide is deposited on the surfaces of the skeletal structure including the channel surfaces and the surfaces of superficial macropores in communication with the channel surfaces as thin deposits in an amount, by weight, of about 1% to 50% and preferably 5% to 30% based on the weight of the skeletal structure.

The preferred oxidation catalysts herein are platinum group metals, e.g., platinum, rhodium, palladium or iridium or combinations thereof. However other oxidation catalysts also utilizable herein are, for example, $Cr_2O_3$, Mn, $V_2O_5$, Cu, Fe, Co or Ni. Application of the oxidation catalytic metal or metal oxide to the skeletal support can be effected by immersing the skeletal structure with or without the refractory metal oxide deposited thereon, in an aqueous solution of a water-soluble inorganic salt or salts of the particular metal or metals, followed by agitating the mixture to insure uniform distribution, and precipitating the metal or metals in the oxide or other chemically combined state, for instance the oxide state, on the skeletal structure. The metal oxide can then be reduced, when the metal form catalyst is desired, by contacting same with a reducing gas, e.g., $H_2$, at an elevated temperature of between 100° C. and 1100° C.

The gas flow channels of the unitary ceramic skeletal supported catalyst herein are thin-walled channels providing a large amount of superficial surface area. The channels can be one or more of a variety of cross-sectional shapes and sizes. The channels can be of the cross-sectional shape, for example, of the shape of a trapezoid, rectangle, square, sinusoid, or circle so that cross-sections of the support represent a repeating pattern that can be described as a honeycomb, corrugated or lattice structure. The walls of the cellular channels are generally of the minimum thickness necessary to provide a strong unitary body. This wall thickness will usually fall in the range of about 2 to 10 mils. With this wall thickness the structures contain from about 100–2500 or more gas inlet openings for the flow channels per square inch and a corresponding number of the gas flow channels, preferably about 400–2000 gas inlet and flow channels per square inch. The open area should be in excess of 60% of the total area. The size and dimensions of the unitary refractory skeletal support of this invention can be varied widely as desired.

The unitary refractory skeletal structure, element or block catalyst supports providing the multiplicity of unobstructed gas flow channels can be prepared from any of the refractory ceramic materials previously mentioned herein. One method of preparing such catalyst supports is by applying by spraying, dipping or brushing a suspension of the pulverized ceramic material and an organic binder, for instance gum arabic, colophony, acrylate resins, methacrylate resins, alkyl resins, phenolic resins, or a chlorinated paraffin, to each side of a plurality of flexible organic carrier sheets, for instance of cellulose, acetate paper, onion skin paper, nylon cloth or polyethylene film. Several of the thus-coated carrier sheets are then corrugated by, for instance crimping or multifolding the sheets, and the remaining coated carrier sheets are left in their original flat condition. The coated corrugated and flat sheets are then superposed one on another in alternate corrugated and flat sheet relationship. The resultant multilayer structure is then fired in a furnace at a slow rate to prevent breakage due to thermal shock and to a temperature sufficiently high to sinter the ceramic particles into a unitary structure. During the firing the organic binders are removed by decomposition and volatilization. Such preparation method is disclosed in British Patent 882,484. The porous inert unitary solid refractory skeletal structure support having the plurality of gas flow channels is also obtained in commerce from the Minnesota Mining and Manufacturing Company.

Figure 2:
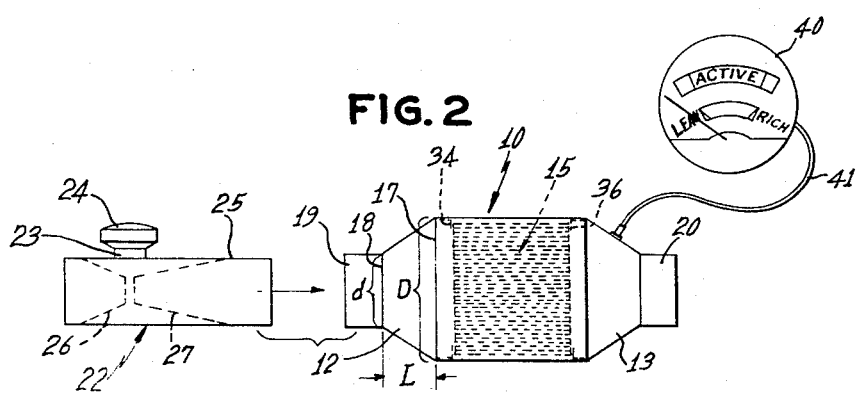
Figure 3:
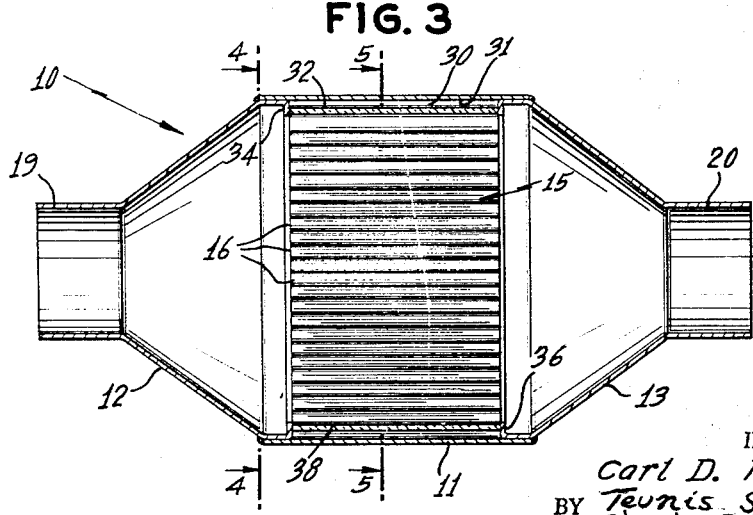
FIGURE 3 is a longitudinal sectional view through the catalytic gas purifier unit of the exhaust gas purification apparatus.

In operation, the exhaust gases from an internal combustion engine, for instance that of a spark ignition reciprocating internal combustion engine of an automobile or fork-lift truck and containing combustible, air-polluting constituents, for instance hydrocarbons, oxygenated hydrocarbons and carbon monoxide, pass at high velocity from the engine exhaust system and through inlet and outlet nozzles 26 and 27 respectively of venturi-inspirator 22 shown in FIGURES 1 and 2. Such passage of the exhaust gases through the nozzles of inspirator 22 actuates the inspirator to cause air to be drawn into and admixed with the exhaust gases in inspirator 22 in amount sufficient to provide an amount of oxygen in the admixture in the amount required for the combustion of the combustible constituents, and preferably in excess of the stoichiometric amount required for such combustion.

From inspirator 22 the admixture of exhaust gases and air at elevated temperature passes within inlet conduit 19 of catalytic purifier 10, and into and through the multiplicity of flow channels 48 extending through supported oxidation catalyst 15. The gaseous admixture contacts the platinum group metal within superficial macropores of porous supported catalyst 15 and also on the surface of the flow channels 48 at a temperature of the supported catalyst of typically about 150° C.–700° C., whereby the combustible air-polluting constituents are oxidized to innocuous gaseous $CO_2$ and $H_2O$. The thus-purified gases are then discharged from purifier 10 through discharge conduit 20 either directly into the atmosphere or into a tail pipe or conduit for ultimate discharge to the atmosphere.

Figure 8:
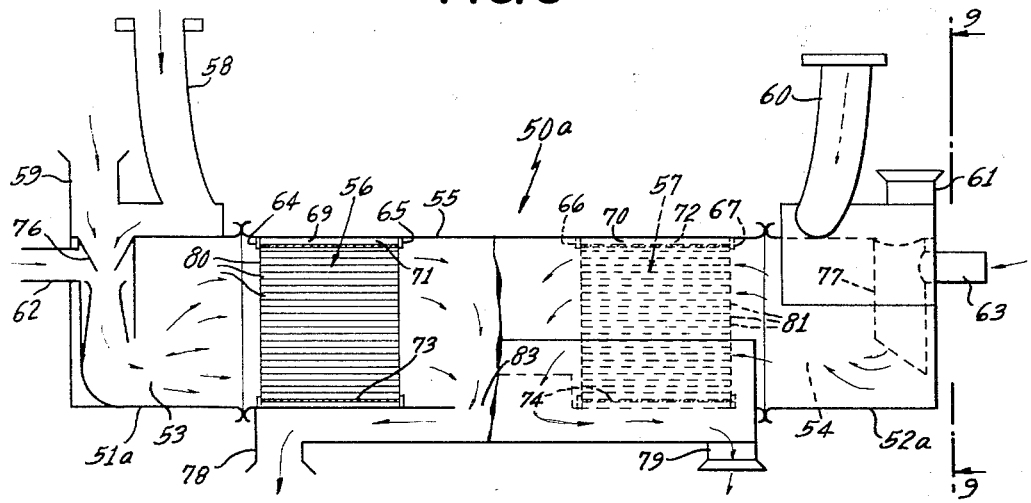
FIGURE 8 is a longitudinal view partially in section of a modification of the exhaust gas purifying apparatus herein.

In the modification of FIGURE 8, exhaust gas catalytic purifier 50a is comprised of three sections, two nonconical end sections 51a and 52a enclosing chambers 53 and 54 respectively and a center or intermediate section 55 which houses two unitary porous refractroy skeletal structure-supported oxidation catalysts, units 56 and 57. Inlet conduits 58 and 59 and 60 and 61 for raw exhaust gas are provided at opposite end portions of the purifier, and inlet conduits 62 and 63 for air are also provided at opposite end portions of the purifier. Annular barrier members 64 and 65 and 66 and 67, welded to the metallic wall of purifier 55, serves to block off the annular spaces 69 and 70 to the flow of exhaust gas. Corrugated knitted mesh metallic fabrics 71 and 72 are disposed in the annular spaces 69 and 70 for absorbing mechanical shock and compensating for differences in thermal expansion of the metallic casing wall of the purifier and the refractory ceramic supports of catalysts 56 and 57. Layers 73 and 74 of Fiberfrax cement is provided about catalyst units 56 and 57 between such units and the corrugated knitted mesh fabrics 71 and 72. Venturi-inspirators 76 and 77 are provided at opposite end portions of the purifier for admixing air with the exhaust gases from the internal combustion engine (not shown); outlets 78 and 79 for purified exhaust gases discharge the purified gases either directly to the atmosphere or to another enclosed passageway, for instance a tail pipe, for ultimate discharge to the atmosphere.

In operation, the internal combustion engine exhaust gases containing the combustible air-polluting constituents, pass at high velocity from the engine exhaust system through inlet conduits 58 and 59 and 60 and 61 and through venturi-inspirators 76 and 77, whereby air is drawn into admixture with the exhaust gases through inlet conduit 62 and 63. The resulting gas mixture passes through the flow channels 80 and 81 in oxidation catalyst units 56 and 57 respectively, wherein the combustible air-polluting constituents are oxidized to innocuous gaseous $CO_2$ and $H_2O$. The thus-purified gases then pass into manifold section 83 of the purifier, within a portion of the purified gases then being discharged through outlet 78 and the other portion of such gases through outlet 79.

In addition to purifying exhaust gases from the internal combustion engines of automotive vehicles, the present invention can also be utilized for purifying the exhaust gases from the internal combustion engines for stationary power sources, for instance pumps and generators.

An exhaust gas purification apparatus as previously described herein and comprising the catalytic gas purifier connected to the venturi-inspirator, was installed in a fork-lift truck by being operatively connected to the exhaust gas tail pipe of the truck. The form lift truck was powered by a Continental F–162 engine operating with nonleaded gasoline. A porous unitary refractory skeletal structure-supported oxidation catalyst with the support of zircon-mullite, of cylindrical shape and about 3″ long and 4⅞″ diameter, was inserted in the gas purifier in such manner that its gas flow channels extended in the direction of gas flow therein from the purifier exhaust gas inlet to the gas outlet. The catalyst support had about 200 gas flow channels per square inch of the support, about 8% by weight activated alumina deposited on the surfaces of the flow channels and of macropores communicating therewith, and about 0.5% by weight Pt deposited on the alumina (percentages of activated alumina and Pt based on total supported catalyst). Analysis of gas samples taken upstream and downstream of the supported oxidation catalyst in the gas purifier, at both idle and governed speeds are set forth below.

|  | Idle | | Governed speed | |
| --- | --- | --- | --- | --- |
|  | Upstream | Downstream | Upstream | Downstream |
| CO, percent | 3.54 | 0.00 | 1.34 | 0.00 |
| CH₄, p.p.m | 320 | 0.00 | 90 | 0.00 |
| C₂H₄, p.p.m | 260 | 0.00 | 250 | 0.00 |
| Hydrocarbons,¹ p.p.m | 590 | 0.00 | 110 | 0.00 |

¹ Calculated as n-hexane.

The test data set forth in the table immediately supra evidence the excellent results in eliminating the nocuous constituents from the exhaust gas, attained by the catalytic purification apparatus herein. "Governed speed" in the table heading was the maximum speed in revolutions per minute as determined by a control mechanism set at about 2500 r.p.m.

The apparatus of this invention is best suited for purifying exhaust gases from internal combustion engines operating on nonleaded fuel, such as unleaded gasoline, inasmuch as the presence of particulate lead and lead compounds in the exhaust gases results in premature deactivation of the oxidation catalyst. However the apparatus herein can, if desired, be utilized to purify the exhaust gases from internal combustion engines operating on leaded fuels also.

We claim:
1. An apparatus for purifying internal combustion engine exhaust gases comprising:
   (a) a cylindrical casing of appreciable length and defining a partially enclosed space of appreciable cross-sectional area;
   (b) end closure means secured to opposite ends of the casing;
   (c) an exhaust gas inlet in the closure means at one end of the casing and a gas outlet in the closure means at the opposite end thereof;
   (d) a cylindrical unitary refractory element-supported oxidation catalyst of lesser diameter than and secured within the casing enclosed space between the closure means gas inlet and outlet, the catalyst comprising as support a porous inert unitary solid refractory skeletal structure having a plurality of exhaust gas inlets at one end thereof, a plurality of gas outlets at the opposite end thereof, and unobstructed gas flow channels extending through the porous skeletal structure from the gas inlets to the gas outlets, and an oxidation catalyst deposited on surfaces of macropores communicating with the flow channels and surfaces of the channels;
   (e) a narrow annular space defined between the unitary supported oxidation catalyst and the casing wall inner surface;
   (f) an inwardly extending annular gas barrier member secured at an upstream end portion of the casing and integral therewith, the barrier member bridging said space between the casing wall inner surface and the supported catalyst upstream face marginal edge portion and overlapping the peripheral edge of said upstream face of the supported oxidation catalyst;
   (g) another inwardly extending annular barrier member secured at a downstream end portion of the casing and integral therewith and bridging a corresponding space between the casing wall inner surface and the supported catalyst downstream face marginal edge portion and overlapping the peripheral edge of said downstream face of the supported oxidation catalyst; and
   (h) resilient flexible means snugly encompassing the unitary refractory element-supported oxidation catalyst in contact therewith and between the supported oxidation catalyst and casing wall inner surface;
whereby the annular barrier members secure the oxidation catalyst within the casing, provide a barrier to gas flow through the annular space between the catalyst and casing, and provide a thermally insulating peripheral edge portion of the supported oxidation catalyst, and the means encompassing the catalyst serves to absorb mechanical shock and compensates for differences in thermal expansion of the casing and the unitary refractory element.

2. The apparatus of claim 1 wherein activated alumina is deposited on surfaces of accessible macropores of the catalyst support communicating with the gas flow channels and also on surfaces of the flow channels and a platinum group metal as oxidation catalyst is deposited on the activated alumina.

3. The apparatus of claim 1 wherein the end closure means secured to opposite ends of the casing are outwardly converging frusto-conical members, the dimensions of the frusto-conical member at the inlet end of the casing being so related as to satisfy the relationship $$\frac{D-d}{L} = \text{between 0.5 and 3 inclusive}$$

wherein D is the diameter of the frusto-conical member wider end, $d$ is the diameter of the frusto-conical member narrower end, and L is the length of the frusto-conical member.

4. The apparatus of claim 3 wherein the gas barrier members are annular flanges of substantially uniform thickness and width integral with the frusto-conical members, the flanges extending inwardly from the inner terminal end portions of the frusto-conical members in such fashion that the plane of each is generally perpendicular to the principal axis of the corresponding frusto-conical member.

5. The apparatus of claim 1 wherein the mechanical shock-absorbing, thermal expansion difference-compensating means is a flexible, knitted mesh corrugated metal fabric.

6. The apparatus of claim 5 further characterized by having a pore-sealing continuous layer of a thermally refractory material on the peripheral surface of the porous unitary refractory support of the catalyst, with the knitted mesh corrugated metal fabric over said pore-sealing layer.

7. The apparatus of claim 1 wherein means for admixing air with the exhaust is disposed essentially immediately prior to the exhaust gas inlet.

8. The apparatus of claim 7 wherein the means for admixing air with the exhaust gases is a venturi-inspirator actuated by engine exhaust gases to effect the inflow and admixture of air therein with the exhaust gases and the outflow of the resulting gaseous admixture therefrom.

References Cited

UNITED STATES PATENTS

| 1,595,711 | 8/1926 | Cornelier. | |
| 1,716,479 | 6/1929 | Bilsky. | |
| 2,853,368 | 9/1958 | Adey | 23—288 |
| 3,041,149 | 6/1962 | Houdry | 23—288 |
| 3,109,715 | 11/1963 | Johnson et al. | 23—288 |
| 3,211,534 | 10/1965 | Ridgway | 23—288 |

FOREIGN PATENTS 238,846  4/1926  Great Britain.

JOSEPH SCOVRONEK, *Primary Examiner.*

U.S. Cl. X.R.

23—277; 181—56, 62